United States Patent
Chiba (10) Patent No.: US 10,128,629 B2
(45) Date of Patent: Nov. 13, 2018

(54) LASER OSCILLATOR PROVIDED WITH DISCHARGE TUBE AND LASER PROCESSING MACHINE

(71) Applicant: FANUC CORPORATION, Minamitsuru-gun, Yamanashi (JP)

(72) Inventor: Tetsuya Chiba, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/644,821

(22) Filed: Mar. 11, 2015

(65) Prior Publication Data

US 2015/0263476 A1 Sep. 17, 2015

(30) Foreign Application Priority Data

Mar. 12, 2014 (JP) ................... 2014-049154

(51) Int. Cl.
| | | |
|---|---|---|
| *H01S 3/032* | (2006.01) | |
| *H01J 17/00* | (2006.01) | |
| *H01S 3/034* | (2006.01) | |
| *H01S 3/041* | (2006.01) | |

(52) U.S. Cl.
CPC .............. *H01S 3/032* (2013.01); *H01J 17/00* (2013.01); *H01S 3/0323* (2013.01); *H01S 3/034* (2013.01); *H01S 3/041* (2013.01)

(58) Field of Classification Search
CPC .......... H01S 3/03; H01S 3/0323; H01S 3/041; H01S 3/034; H01J 17/00
See application file for complete search history.

(56) References Cited

U.S. PATENT DOCUMENTS

| | | | |
|---|---|---|---|
| 3,428,914 A | | 2/1969 | Bell |
| 4,876,690 A | | 10/1989 | Nishida et al. |
| 4,910,742 A | | 3/1990 | Meinhardt |
| 4,955,033 A | | 9/1990 | Maitland |
| 5,283,800 A | * | 2/1994 | Suzuki .............. H01S 3/031 372/56 |
| 5,325,391 A | | 6/1994 | Hall |
| 6,249,535 B1 | * | 6/2001 | Hayashikawa ......... H01S 3/041 372/103 |
| 6,263,007 B1 | * | 7/2001 | Tang .................. G03F 7/70025 372/59 |

FOREIGN PATENT DOCUMENTS

| | | |
|---|---|---|
| CN | 2151553 Y | 12/1993 |
| DE | 2824761 A1 | 12/1978 |
| JP | 55126678 | 2/1954 |

(Continued)

OTHER PUBLICATIONS

Japanese Office Action dated Aug. 4, 2015 for Japanese Application No. 2014-049154, including English translation.

*Primary Examiner* — Marcia Golub-Miller
(74) *Attorney, Agent, or Firm* — RatnerPrestia (57) ABSTRACT

A laser oscillator which can effectively remove scattered light by a simpler configuration. The laser oscillator comprises an output mirror and a rear mirror which are arranged facing each other and a discharge tube which is arranged between the output mirror and the rear mirror. The discharge tube has a first part which gets larger in inner diameter from a first end part in an axial direction facing the output mirror toward the rear mirror.

4 Claims, 6 Drawing Sheets

(56) References Cited

FOREIGN PATENT DOCUMENTS

| | | |
|---|---|---|
| JP | 58079785 | 5/1983 |
| JP | 61097885 | 5/1986 |
| JP | 61097983 | 5/1986 |
| JP | 62502437 | 9/1987 |
| JP | 6457694 A | 3/1989 |
| JP | 02043780 | 2/1990 |
| JP | 04223382 | 8/1992 |
| JP | 05136504 | 6/1993 |
| JP | 06013682 | 1/1994 |
| JP | 06140693 | 5/1994 |
| JP | 06275921 | 9/1994 |
| JP | 07235713 | 9/1995 |
| JP | 09008386 | 1/1997 |
| JP | 11-054816 A | 2/1999 |

\* cited by examiner

LASER OSCILLATOR PROVIDED WITH DISCHARGE TUBE AND LASER PROCESSING MACHINE

BACKGROUND OF THE INVENTION

1. Field of the Invention

The invention relates to a laser oscillator which is provided with a discharge tube and to a laser processing machine.

2. Description of the Related Art

Known in the art is a laser oscillator in which a plurality of components for removing scattered light which is contained in a laser beam are arranged inside an optical resonance space (for example, Japanese Patent Publication No. 11-54816A).

In the above-mentioned such laser oscillator, in order to effectively remove the scattered light, the elements for removing the scattered light have to be accurately positioned in the optical resonance space. This led to complication of the manufacturing process. Therefore, a laser oscillator which can effectively remove scattered light by a simpler configuration has been sought.

SUMMARY OF THE INVENTION

In one aspect of the invention, the laser oscillator comprises an output mirror and a rear mirror which are arranged opposite to each other; and a discharge tube which is arranged between the output mirror and the rear mirror and which includes a first part. The inner diameter of the first part gets larger from a first end part in an axial direction facing the output mirror toward the rear mirror.

The inner diameter of the first part may get larger in a stepwise manner from the first end part toward the rear mirror. The first part may include a first discharge tube which includes the first end part and which has a first inner diameter which is constant in the axial direction; and a second discharge tube which is arranged to adjoin the first discharge tube at the opposite side to the output mirror and which has a second inner diameter which is constant in the axial direction. The second inner diameter is larger than the first inner diameter. The difference between the first inner diameter and the second inner diameter may be smaller than 100 µm. The inner diameter of the first part may get continuously larger the further from the first end part toward the rear mirror.

The first part may include a first discharge tube which includes the first end part and which has an inner diameter which gets continuously larger the further from the first end part toward the rear mirror; and a second discharge tube which is arranged to adjoin the first discharge tube at the opposite side to the output mirror and which has an inner diameter which gets continuously larger the further from the end part in the axial direction facing the first discharge tube toward the rear mirror.

The discharge tube may further include a second part. The inner diameter of the second part gets larger from a second end part in the axial direction facing the rear mirror toward the output mirror. The inner diameter of the second part may get larger in a stepwise manner from the second end part toward the output mirror. The second part may include a third discharge tube which includes the second end part and which has a third inner diameter which is constant in the axial direction; and a fourth discharge tube which is arranged to adjoin the third discharge tube at the opposite side to the rear mirror and which has a fourth inner diameter which is constant in the axial direction. The fourth inner diameter is larger than the third inner diameter.

The inner diameter of the second part may get continuously larger from the second end part toward the output mirror. The second part may include a third discharge tube which includes the second end part and which has an inner diameter which gets continuously larger from the second end part toward the output mirror; and a fourth discharge tube which is arranged to adjoin the third discharge tube at the opposite side to the rear mirror and which has an inner diameter which gets continuously larger from the end part in the axial direction facing the third discharge tube toward the output mirror.

In another aspect of the invention, a laser processing machine is provided with the above-mentioned laser oscillator.

BRIEF DESCRIPTION OF THE DRAWINGS

These and other objects, features, and advantages of the invention will become clearer with reference to the detailed description of illustrative embodiments of the invention which are shown in the attached drawings, wherein.

DETAILED DESCRIPTION

Below, embodiments of the invention will be explained in detail based on the drawings. First, referring to FIG. 1 and FIG. 2, a laser processing machine 10 according to an embodiment of the invention will be explained. Note that, in the following explanation, the axial direction indicates the direction along the optical axis O in FIG. 2, while the left direction in the axial direction (axially leftward) corresponds to the left direction in FIG. 2. Further, the radial direction indicates the radial direction of a circle centered about the optical axis O. Further, the circumferential direction indicates the circumferential direction of the circle centered about the optical axis O.

Figure 1:
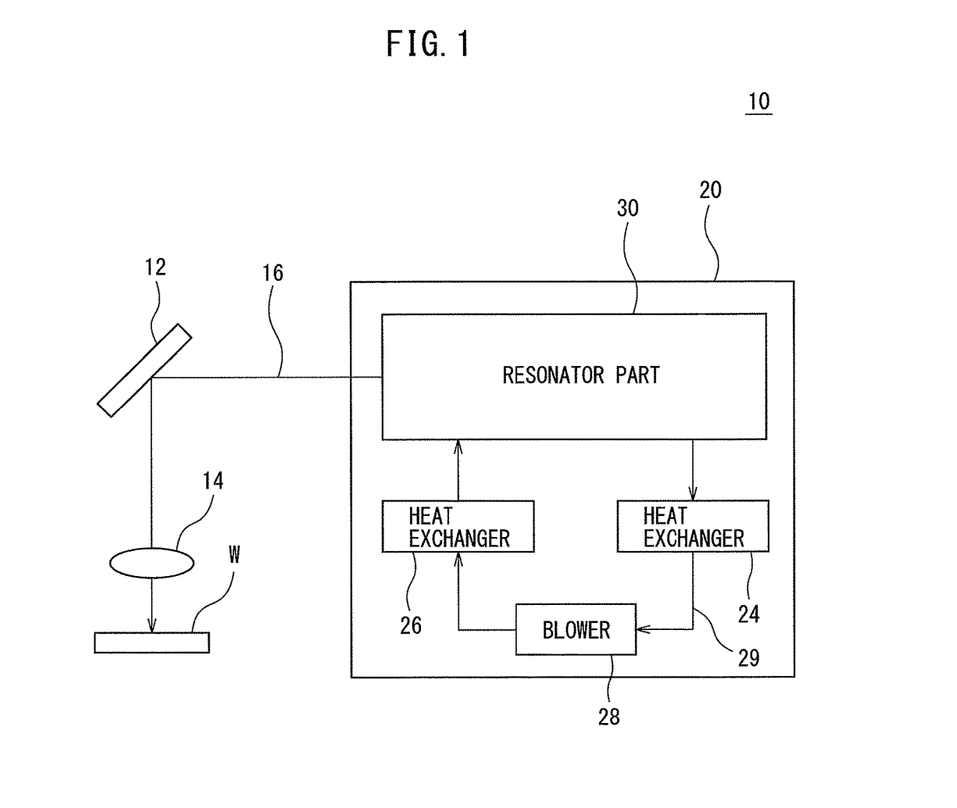
FIG. 1 is a block diagram of a laser processing machine according to an embodiment of the invention.

The laser processing machine 10 includes a laser oscillator 20, reflecting mirror 12, and condensing lens 14. The laser oscillator 20 generates a laser beam inside thereof, and emits a laser beam 16 to a reflecting mirror 12. The reflecting mirror 12 is arranged on an optical path of the laser beam 16 emitted from the laser oscillator 20. The reflecting mirror 12 reflects the laser beam 16 toward the condensing lens 14. The condensing lens 14 focuses the laser beam 16 reflected by the reflecting mirror 12 onto the workpiece W. The laser processing machine 10 irradiates the laser beam 16 onto the workpiece W, and machines the workpiece W by the laser processing.

The laser oscillator 20 includes a resonator part 30, heat exchangers 24 and 26, and a blower 28. The resonator part 30, heat exchangers 24 and 26, and blower 28 are fluidly connected by a fluid path 29. The inside of the resonator part 30 is filled with a laser medium.

When the blower 28 is driven, the laser medium is introduced into the heat exchangers 24 and 26 through the fluid path 29, whereby the laser medium is cooled by the heat exchangers 24 and 26. The cooled laser medium is again introduced into the resonator part 30. In this way, the laser medium circulates around the resonator part 30, the first heat exchanger 24, the blower 28, and the second heat exchanger 26, through the fluid path 29.

Figure 2:
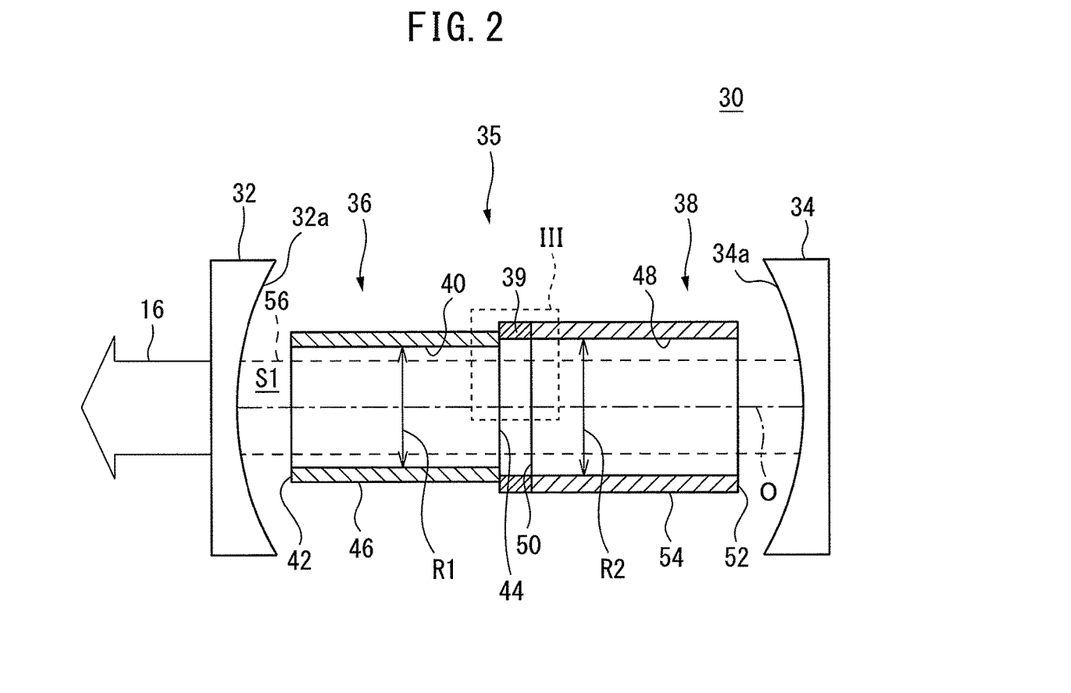
FIG. 2 is a schematic view of a resonator part shown in FIG. 1, wherein only a discharge tube is illustrated in cross-section.

As shown in FIG. 2, the resonator part 30 includes an output mirror 32 and a rear mirror 34 which are arranged opposite to each other; and a discharge tube 35 which is arranged between the output mirror 32 and the rear mirror 34. The output mirror 32 is configured by a partial reflecting mirror (so-called half mirror), and has a concave surface 32a at the side facing the rear mirror 34.

The output mirror 32 can make a part of the laser beam incident on the concave surface 32a to pass therethrough, and emits it to the outside as the laser beam 16. The rear mirror 34 is configured by a total reflecting mirror and has a concave surface 34a at the side facing the output mirror 32. The rear mirror 34 reflects substantially the entire laser beam incident on the concave surface 34a. An optical resonance space S1 is defined between the output mirror 32 and the rear mirror 34.

The discharge tube 35 includes a first discharge tube 36 and a second discharge tube 38 which are connected to each other via a connection member 39. The first discharge tube 36 is a tubular member constituted by a material capable of absorbing a laser beam, such as quartz, and is arranged concentrically with the optical axis O. The first discharge tube 36 has a left end face (first end part) 42 facing the output mirror 32; a right end face 44 opposite the left end face 42; and an inner circumferential surface 40 extending from the left end face 42 to the right end face 44. The inner circumferential surface 40 has an inner diameter R1 which is constant in the axial direction.

The outer circumferential surface 46 of the first discharge tube 36 may be any shaped surface, e.g. a circular cylindrical surface or a polygonal-shaped tubular surface. An electrode (not shown) is arranged at the outer circumferential surface 46 of the first discharge tube 36. The electrode is electrically connected to a power source (not shown) installed at outside of the resonator part 30.

The second discharge tube 38 is arranged adjacent to the right side of the discharge tube 36 via the connection member 39. Similar to the first discharge tube 36, the second discharge tube 38 is a tubular member constituted by a material capable of absorbing a laser beam, such as quartz, and is arranged concentrically with the optical axis O. The second discharge tube 38 has a left end face 50 facing the right end face 44 of the first discharge tube 35 via the connection member 39; a right end face 52 facing the rear mirror 34; and an inner circumferential surface 48 extending from the left end face 50 to the right end face 52.

The inner circumferential surface 48 has an inner diameter R2 which is constant in the axial direction. Here, the inner diameter R2 of the second discharge tube 38 is set larger than the inner diameter R1 of the first discharge tube 36. Similar to the outer circumferential surface 46 of the first discharge tube 36, the outer circumferential surface 54 of the second discharge tube 38 may be any shaped surface. An electrode (not shown) is arranged at the outer circumferential surface 54 of the second discharge tube 38. The electrode is electrically connected to the above-mentioned power source.

The connection member 39 is a ring-shaped member made of a material capable of absorbing a laser beam, such as metal, and is arranged between the first discharge tube 36 and the second discharge tube 38. The connection member 39 has an inner diameter which is equal to or larger than the inner diameter R2 of the second discharge tube 38.

The discharge tube 35 is supported by a fastening member (not shown) via O-rings which are respectively fitted to the outer circumferential surface 46 of the first discharge tube 36 and the outer circumferential surface 54 of the second discharge tube 38, so that the discharge tube 35 is positioned between the output mirror 32 and the rear mirror 34 so as to be concentric with respect to the optical axis O.

Next, referring to FIG. 1 and FIG. 2, the operation of the laser processing machine 10 according to the present embodiment will be explained. From the above-mentioned power source, an electric voltage is applied to the electrode provided at the first discharge tube 36 and the electrode provided at the second discharge tube 38, whereby an electric discharge is generated inside of the first discharge tube 36 and the second discharge tube 38.

Due to this, the laser medium which circulates through the inside of the first discharge tube 36 and the second discharge tube 38 is excited, whereby a laser beam 56 having the optical axis O at its center is generated in the optical resonance space S1 defined between the output mirror 32 and the rear mirror 34. Then, a part of the laser beam 56 generated in the optical resonance space S1 transmits through the output mirror 32 and is emitted as the laser beam 16.

Here, the discharge tube 35 according to the present embodiment has an inner diameter getting larger in a stepwise manner as traveling from the end face 42 facing the output mirror 32 toward the rear mirror 34. In other words, the inner diameter of the discharge tube 35 becomes smaller in a step wise manner the further toward the output mirror 32. Due to this configuration, the scattered light components of the laser beam 56 can be removed. This function will be explained below with reference to FIG. 2 to FIG. 5. Note that, from the viewpoint of easier understanding, in FIG. 3, the connection member 39 is omitted.

Figure 3:
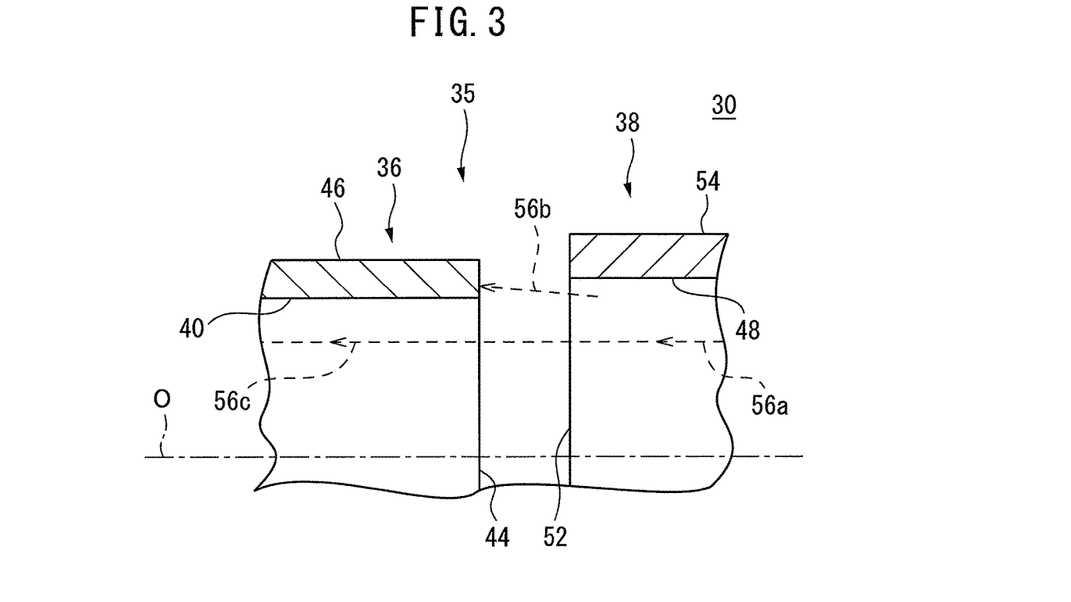
FIG. 3 is an enlarged view of the region III in FIG. 2.
Figure 4:
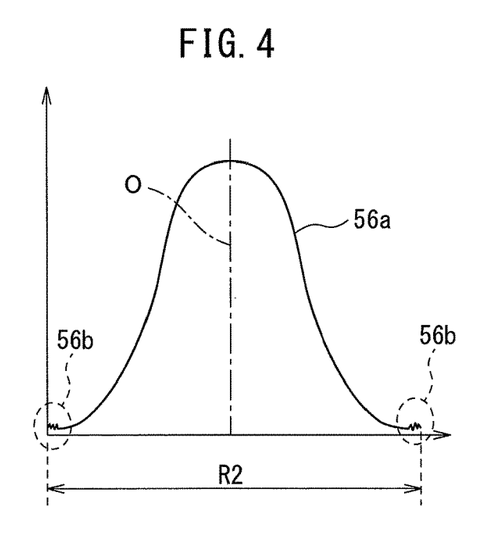
FIG. 4 shows an intensity distribution of a laser beam which propagates through the inside of the second discharge tube shown in FIG. 2 toward the output mirror.

The intensity distribution of the laser beam 56a (FIG. 3) which propagates inside of the second discharge tube 38 toward the output mirror 32 becomes as shown in FIG. 4. As shown in FIG. 4, the laser beam 56a includes components of scattered light 56b at the outer edge region (corresponding to a region in vicinity of the inner circumferential surface 48 of second discharge tube 38) which is separated from the optical axis O to the radially outside. The scattered light 56b does not contribute to machining of the workpiece W, and acts to cause the workpiece W to be heated unnecessarily.

Figure 5:
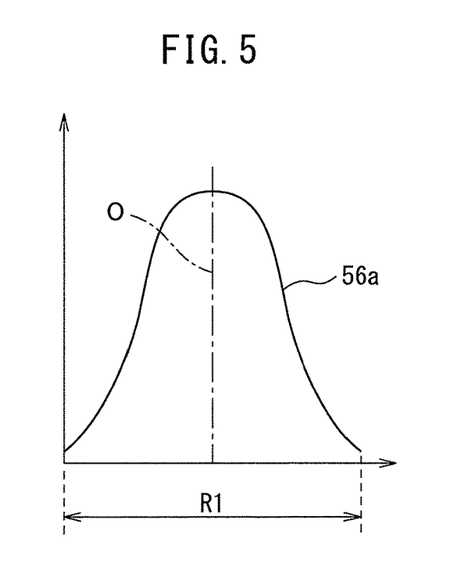
FIG. 5 shows an intensity distribution of a laser beam which propagates through the inside of the first discharge tube shown in FIG. 2 toward the output mirror.

In the present embodiment, as shown in FIG. 3, the scattered light 56b contained in the laser beam 56a propagates to the left direction in the vicinity of the inner circumferential surface 48 of the second discharge tube 38, then enters the right end face 44 of the first discharge tube 36, whereby is absorbed by the right end face 44. As a result, in the intensity distribution of the laser beam 56c propagating inside of the first discharge tube 36 toward the output mirror 32, the components of the scattered light 56b are removed, as shown in FIG. 5.

Thus, according to the present embodiment, the inner diameter of the discharge tube 35 decreases from R2 to R1 in a stepwise manner in the direction from the rear mirror 34 toward the output mirror 32 (i.e., the left direction). Due to this, it is possible to remove the scattered-light components contained in the laser beam 56a propagating toward the output mirror 32 by making them to enter the right end face 44 of the first discharge tube 36. As a result, it is possible to emit to the outside a laser beam 16 which does not contain components of the scattered light 56b and therefore has a higher quality intensity distribution. Accordingly, it is possible to machine the workpiece W with a higher precision.

Further, according to the present embodiment, since the above-mentioned scattered light 56b is absorbed by the first discharge tube 36 itself, there is no need to provide an another element for removing the scattered light. Therefore, it is possible to effectively remove the scattered light 56b with a simpler configuration.

As an alternative to the resonator part 30 shown in FIG. 2, various types of resonator parts can be applied to the laser oscillator 20, as explained below. Next, referring to FIG. 6 and FIG. 7, a resonator part 60 according to another embodiment will be explained. Note that, elements similar to the above-mentioned embodiment are assigned the same numeral references, and the detailed explanations thereof are omitted.

Figure 6:
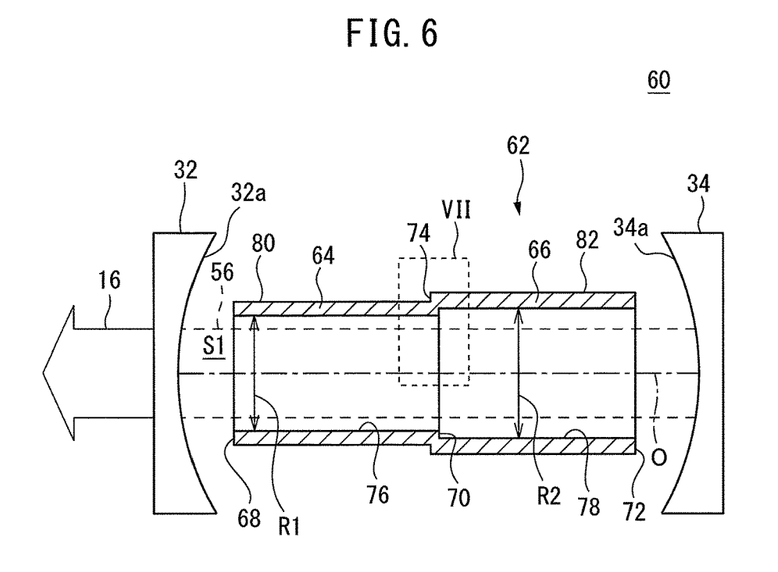
FIG. 6 is a schematic view of a resonator part according to another embodiment of the invention, wherein only a discharge tube is illustrated in cross-section.

The resonator part 60 includes an output mirror 32, rear mirror 34, and a discharge tube 62 arranged between the output mirror 32 and the rear mirror 34. The discharge tube 62 is constituted by e.g. quartz, and includes a small diameter part 64 and a large diameter part 66 which are integrally coupled with each other in the axial direction. The small diameter part 64 and the large diameter part 66 are arranged concentrically with the optical axis O. The small diameter part 64 has a left end face (first end part) 68 facing the output mirror 32; and a cylindrical inner circumferential surface 76.

The inner circumferential surface 76 extends from the left end face 68 to the inside end face 70 formed at the inner periphery of the connection between the small diameter part 64 and the large diameter part 66. The inner circumferential surface 76 has an inner diameter R1 which is constant in the axial direction. Further, the small diameter part 64 has an outer circumferential surface 80 extending from the left end face 68 to the outside end face 74 formed at the outer periphery of the connection between the small diameter part 64 and the large diameter part 66.

On the other hand, the large diameter part 66 has a right end face 72 facing the rear mirror 34; and a cylindrical inner circumferential surface 78 extending from the right end face 72 to the inside end face 70. The inner circumferential surface 78 has an inner diameter R2 which is constant in the axial direction. Here, the inner diameter R2 of the large diameter part 66 is set larger than the inner diameter R1 of the small diameter part 64. The large diameter part 66 has an outer circumferential surface 82 extending from the right end face 72 to the outside end face 74. Each of the outer circumferential surface 80 of the small diameter part 64 and the outer circumferential surface 82 of the large diameter part 66 may be any surface having any shape, such as a circular cylindrical surface or a polygonal tubular surface.

Electrodes (not shown) are respectively provided at the outer circumferential surface 80 of the small diameter part 64 and the outer circumferential surface 82 of the large diameter part 66. These electrodes are connected to a power source (not shown) provided outside of the resonator part 60.

As explained above, in the present embodiment, the inner diameter of the discharge tube 62 decreases from R2 to R1 in a stepwise manner at the inside end face 70 along the direction from the rear mirror 34 to the output mirror 32. According to this configuration, it is possible to remove the scattered-light components of the laser beam propagating toward the output mirror 32, as the embodiment shown in FIG. 2.

Figure 7:
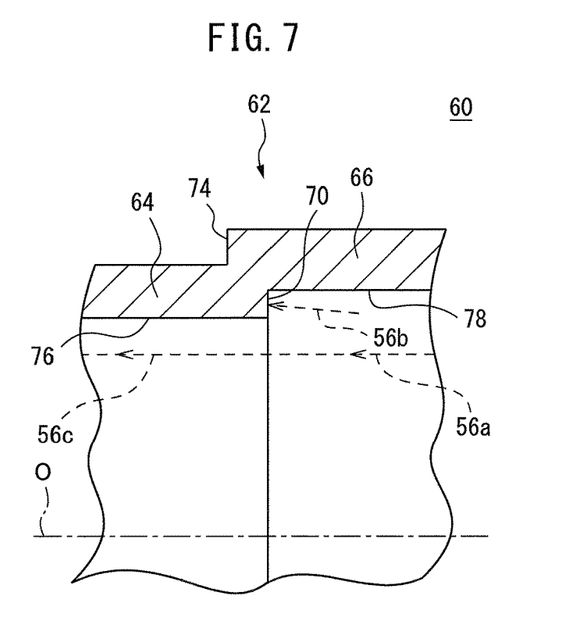
FIG. 7 is an enlarged view of the region VII in FIG. 6.

Specifically, as shown in FIG. 7, the laser beam 56a propagating inside of the large diameter part 66 toward the output mirror 32 contains the scattered light 56b at the radially outside edge region of the laser beam 56a. The scattered light 56b propagates leftward in the vicinity of the inner circumferential surface 78 of the large diameter part 66, and then enters the inside end face 70.

As a result, the components of the scattered light 56b are removed from the intensity distribution of the laser beam 56c which propagates inside of the small diameter part 64 toward the output mirror 32. Due to this, it is possible to emit to the outside a laser beam 16 which does not contain components of scattered light 56b and therefore has a higher quality intensity distribution. Accordingly, it is possible to process the workpiece W more precisely. Further, since the scattered light 56b is absorbed by the discharge tube 62, there is no need to provide another element for removing the scattered light. Therefore, it is possible to effectively remove the scattered light 56b with a simpler configuration.

Figure 8:
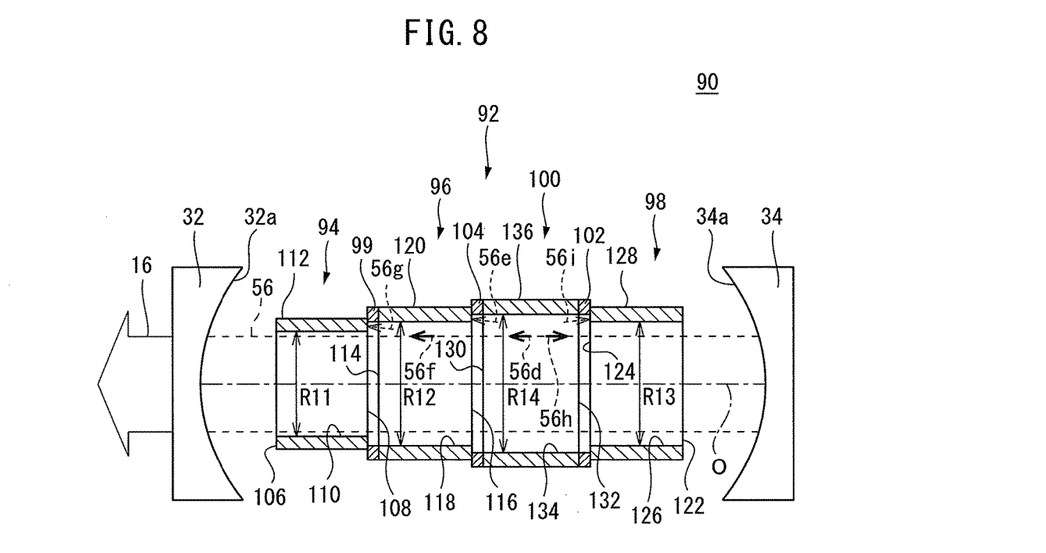
FIG. 8 is a schematic view of a resonator part according to still another embodiment of the invention, wherein only a discharge tube is illustrated in cross-section.

Next, referring to FIG. 8, a resonator part 90 according to still another embodiment will be explained. Note that, elements similar to the above embodiments are assigned the same numeral references, and detailed explanations thereof are omitted. The resonator part 90 includes an output mirror 32, a rear mirror 34, and a discharge tube 92 arranged between the output mirror 32 and the rear mirror 34. The discharge tube 92 includes a first discharge tube 94 adjoining the output mirror 32; a second discharge tube 96 adjoining the right side of the first discharge tube 94; a third discharge tube 98 adjoining the rear mirror 34; and a fourth discharge tube 100 arranged between the second discharge tube 96 and the third discharge tube 98.

The first discharge tube 94 and the second discharge tube 96 are connected to each other via a connection member 99. Further, the third discharge tube 98 and the fourth discharge tube 100 are connected to each other via a connection member 102. Further, the second discharge tube 96 and the fourth discharge tube 100 are connected to each other via a connection member 104. Each of the first to fourth discharge tubes 94, 96, 98 and 100 is constituted by e.g. quartz, and includes an electrode (not shown) electrically connected to an external power source.

The first discharge tube 94 has a left end face (first end part) 106 facing the output mirror 32; a right end face 108 opposite the left end face 106; and a cylindrical inner circumferential surface 110 extending from the left end face 106 to the right end face 108. The inner circumferential surface 110 has an inner diameter R11 which is constant in the axial direction. Further, the first discharge tube 94 has an outer circumferential surface 112 extending from the left end face 106 to the right end face 108.

The second discharge tube 96 has a left end face 114 facing the right end face 108 of the first discharge tube 94; a right end face 116 opposite the left end face 114; and a cylindrical inner circumferential surface 118 extending from the left end face 114 to the right end face 116. The inner circumferential surface 118 has an inner diameter R12 which is constant in the axial direction. Further, the second discharge tube 96 has an outer circumferential surface 120 extending from the left end face 114 to the right end face 116.

The third discharge tube 98 has a right end face (second end part) 122 facing the rear mirror 34; a left end face 124 opposite the right end face 122; and a cylindrical inner circumferential surface 126 extending from the right end face 122 to the left end face 124. The inner circumferential surface 126 has an inner diameter R13 which is constant in the axial direction. Further, the third discharge tube 98 has an outer circumferential surface 128 extending from the right end face 122 to the left end face 124.

The fourth discharge tube 100 has a left end face 130 facing the right end face 116 of the second discharge tube 96; a right end face 132 facing the left end face 124 of the third discharge tube 98; and a cylindrical inner circumferential surface 134 extending from the left end face 130 to the right end face 132. The inner circumferential surface 134 has an inner diameter R14 which is constant in the axial direction. Further, the fourth discharge tube 100 has an outer circumferential surface 136 extending from the left end face 130 to the right end face 132.

Here, in the present embodiment, the inner diameters R11 to R14 are set to satisfy the relationships shown in the following formulas 1 to 4.

$$R11 < R13 < R12 < R14 \quad \text{(formula 1)}$$

$$|R11 - R12| < 100 \; \mu m \quad \text{(formula 2)}$$

$$|R12 - R14| < 100 \; \mu m \quad \text{(formula 3)}$$

$$|R14 - R13| < 100 \; \mu m \quad \text{(formula 4)}$$

As specific examples of the inner diameters R11 to R14, there are R11=20.00 mm, R12=20.06 mm, R13=20.03 mm, and R14=20.09 mm.

In the present embodiment, the inner diameter of the discharge tube 92 increases in two steps as travelling from the end face 106 facing the output mirror 32 toward the rear mirror 34 over the first discharge tube 94, the second discharge tube 96, and the fourth discharge tube 100. Thus, the first discharge tube 94, the second discharge tube 96, and the fourth discharge tube 100 constitute a first part of the discharge tube 92, the inner diameter of which gets larger from the end face 106 toward the rear mirror 34.

On the other hand, the inner diameter of the discharge tube 92 increases in one step as travelling from the end face 122 facing the rear mirror 34 toward the output mirror 32 over the third discharge tube 98 and the fourth discharge tube 100. Thus, the third discharge tube 98 and the fourth discharge tube 100 constitute a second part of the discharge tube 92, the inner diameter of which gets larger from the end face 122 toward the output mirror 32.

In the present embodiment, the scattered light 56e of the laser beam 56d propagating inside of the fourth discharge tube 100 toward the output mirror 32 enters the right end face 116 of the second discharge tube 96, and is absorbed there. Further, the scattered light 56g of the laser beam 56f propagating inside of the second discharge tube 96 toward the output mirror 32 enters the right end face 108 of the first discharge tube 94, and is absorbed there. In this way, according to the present embodiment, it is possible to remove the scattered light from the laser beam propagating toward the output mirror 32 in two steps at the right end face 116 and the right end face 108.

On the other hand, the scattered light 56i of the laser beam 56h propagating inside of the fourth discharge tube 100 toward the rear mirror 34 enters the left end face 124 of the third discharge tube 98, and is absorbed there. In this way, according to the present embodiment, it is possible to remove the scattered light from the laser beam propagating toward the rear mirror 34 at the left end face 124.

According to this configuration, it is possible to remove the scattered-light components from a laser beam propagating toward either the output mirror 32 or the rear mirror 34. Therefore, it is possible to emit to the outside a laser beam 16 having a higher quality intensity distribution, whereby the workpiece W can be processed more precisely. Further, since the scattered light is absorbed by the discharge tube 92, there is no need to provide another element for removing the scattered light. Therefore, the scattered light can be effectively removed by a simpler configuration.

Further, according to the present embodiment, even when the inner diameters R11, R12, R13, and R14 of the discharge tubes 94, 96, 98, and 100 include variations due to tolerances, it is possible to construct a resonator part 90 capable of removing the scattered light component by appropriately changing the arrangement of the discharge tubes 94, 96, 98, and 100 based on the actual dimensions of the inner diameters of the discharge tubes 94, 96, 98, and 100. Therefore, it is possible to improve the manufacturing efficiency of the laser oscillator.

Next, referring to FIG. 9, a resonator part 140 according to still another embodiment will be explained. Note that, elements similar to the above embodiments are assigned the same numeral references, and the detailed explanations thereof are omitted. The resonator part 140 includes an output mirror 32, a rear mirror 34, and a discharge tube 142 arranged between the output mirror 32 and the rear mirror 34.

The discharge tube 142 includes a first discharge tube 144 adjoining the output mirror 32; a second discharge tube 146 adjoining the right side of the first discharge tube 144; a third discharge tube 148 adjoining the rear mirror 34; a fourth discharge tube 150 adjoining the left side of the third discharge tube 148; and a fifth discharge tube 152 arranged between the second discharge tube 146 and the fourth discharge tube 150.

The first discharge tube 144 and the second discharge tube 146, the second discharge tube 146 and the fifth discharge tube 152, the fifth discharge tube 152 and the fourth discharge tube 150, and the fourth discharge tube 150 and the third discharge tube 148 are respectively connected together via connection members (not shown). Further, each of the first to fifth discharge tubes 144, 146, 148, 150 and 152 is constituted by e.g. quartz, and has an electrodes (not shown) electrically connected to an external power source.

The first discharge tube 144 has a left end face (first end part) 154 facing the output mirror 32; a right end face 156 opposite the left end face 154; and a cylindrical inner circumferential surface 158 extending from the left end face 154 to the right end face 156. The inner circumferential surface 158 has a constant inner diameter R21 in the axial direction.

The second discharge tube 146 has a left end face 160 facing the right end face 156 of the first discharge tube 144; a right end face 162 opposite the left end face 160; and a cylindrical inner circumferential surface 164 extending from the left end face 160 to the right end face 162. The inner circumferential surface 164 has a constant inner diameter R22 in the axial direction.

The third discharge tube 148 has a right end face (second end part) 166 facing the rear mirror 34; a left end face 168 opposite the right end face 166; and a cylindrical inner circumferential surface 170 extending from the right end face 166 to the left end face 168. The inner circumferential surface 170 has a constant inner diameter R23 in the axial direction.

The fourth discharge tube 150 has a right end face 172 facing the left end face 168 of the third discharge tube 148; a left end face 174 opposite the right end face 172; and a cylindrical inner circumferential surface 176 extending from the right end face 172 to the left end face 174. The inner circumferential surface 176 has a constant inner diameter R24 in the axial direction.

The fifth discharge tube 152 has a left end face 178 facing the right end face 162 of the second discharge tube 146; a right end face 180 facing the left end face 174 of the fourth discharge tube 150; and a cylindrical inner circumferential surface 182 extending from the left end face 178 to the right end face 180. The inner circumferential surface 182 has a constant inner diameter R25 in the axial direction.

Here, in the present embodiment, the inner diameters R21 to R25 are set to satisfy the relationships shown in the following formulas 5 to 9.

$$R21 < R23 < R22 < R24 < R25 \quad \text{(formula 5)}$$

$$|R21 - R22| < 100 \, \mu m \quad \text{(formula 6)}$$

$$|R22 - R25| < 100 \, \mu m \quad \text{(formula 7)}$$

$$|R25 - R24| < 100 \, \mu m \quad \text{(formula 8)}$$

$$|R24 - R23| < 100 \, \mu m \quad \text{(formula 9)}$$

As specific examples of the inner diameters R21 to R25, there are R21=20.00 mm, R22=20.06 mm, R23=20.03 mm, R24=20.09 mm, and R25=20.12 mm.

In the present embodiment, the inner diameter of the discharge tube 142 increases in two steps as travelling from the end face 154 facing the output mirror 32 toward the rear mirror 34 over the first discharge tube 144, the second discharge tube 146, and the fifth discharge tube 152. Thus, the first discharge tube 144, the second discharge tube 146, and the fifth discharge tube 152 constitute a first part of the discharge tube 142, the inner diameter of which gets larger from the end face 154 toward the rear mirror 34.

On the other hand, the inner diameter of the discharge tube 142 increases in two steps as travelling from the end face 166 facing the rear mirror 34 toward the output mirror 32 over the third discharge tube 148, the fourth discharge tube 150, and the fifth discharge tube 152. Thus, the third discharge tube 148, the fourth discharge tube 150, and the fifth discharge tube 152 constitute a second part of the discharge tube 142, the inner diameter of which gets larger from the end face 166 toward the output mirror 32.

According to the present embodiment, the scattered light of the laser beam propagating inside of the discharge tube 142 toward the output mirror 32 enters the right end face 162 of the second discharge tube 146 and the right end face 156 of the first discharge tube 144 until reaching the output mirror 32, and is absorbed. Therefore, it is possible to remove the scattered light from the laser beam propagating toward the output mirror 32 in two steps at the right end face 162 and the right end face 156.

On the other hand, the scattered light of the laser beam propagating inside of the discharge tube 142 toward the rear mirror 34 enters the left end face 174 of the fourth discharge tube 150 and the left end face 168 of the third discharge tube 148, and is absorbed. Therefore, it is possible to remove the scattered light from the laser beam propagating toward the rear mirror 34 in two steps at the left end face 174 and the left end face 168.

According to this configuration, it is possible to effectively remove the scattered-light components from a laser beam propagating toward either the output mirror 32 or the rear mirror 34. Therefore it is possible to emit to the outside a laser beam 16 having a further higher quality intensity distribution, whereby the workpiece W can be more precisely processed. Further, the scattered light is absorbed by the discharge tube 142, so there is no need to provide another element for removing the scattered light. Therefore, scattered light can be effectively removed by a simpler configuration.

Further, according to the present embodiment, even when the inner diameters R21, R22, R23, R24, and R25 of the discharge tubes 144, 146, 148, 150, and 152 include variations due to tolerances, it is possible to construct the resonator part 140 capable of removing the scattered light component by appropriately changing the arrangement of the discharge tubes based on the actual dimensions of the inner diameters of the discharge tubes.

Figure 10:
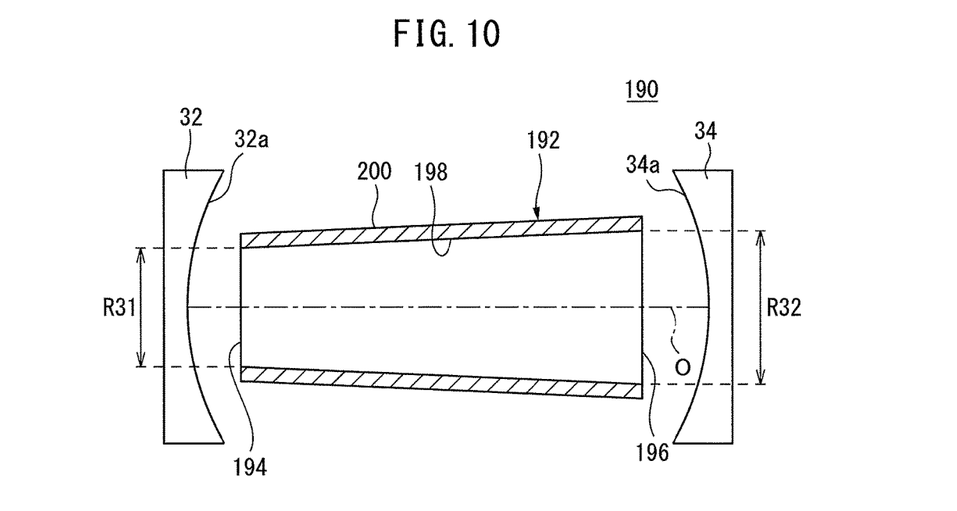
FIG. 10 is a schematic view of a resonator part according to still another embodiment of the invention, wherein only a discharge tube is illustrated in cross-section.

Next, referring to FIG. 10, a resonator part 190 according to still another embodiment will be explained. Note that, elements similar to the above embodiments are assigned the same numeral references, and the detailed explanations thereof are omitted. The resonator part 190 includes an output mirror 32, a rear mirror 34, and a discharge tube 192 arranged between the output mirror 32 and the rear mirror 34.

The discharge tube 192 has a left end face (first end part) 194 facing the output mirror 32; a right end face 196 facing the rear mirror 34; and an inner circumferential surface 198 and an outer circumferential surface 200 extending from the left end face 194 to the right end face 196. The discharge tube 192 is constituted by e.g. quartz. An electrode (not shown) connected to the external power source is arranged at the outer circumferential surface 200 of the discharge tube 192. The outer circumferential surface 200 of the discharge tube 192 may be a surface of any shape, such as a circular cylindrical surface or a polygonal tubular surface.

In the present embodiment, the inner diameter of the inner circumferential surface 198 of the discharge tube 192 gets continuously larger the further from the left end face 194 toward the right end face 196. More specifically, the inner diameter of the inner circumferential surface 198 continuously increases from the inner diameter R31 at the left end face 194 to the inner diameter R32 at the right end face 196, as the inner circumferential surface 198 extends toward the rear mirror 34.

In other words, the inner diameter of the inner circumferential surface 198 is gradually decreased from the right end face 196 toward the left end face 194 of the discharge tube 192. According to this configuration, the scattered light contained in the laser beam propagating inside of the discharge tube 192 toward the output mirror 32 enters into and absorbed by the inner circumferential surface 198, the inner diameter of which gradually decreases toward the output mirror 32, as the laser beam propagates in the discharge tube 192 toward the output mirror 32. As a result, the scattered-light components in the laser beam incident on the output mirror 32 can be removed.

Therefore, the output mirror 32 can emit a laser beam 16 which does not contain scattered-light components and therefore has a higher quality of intensity distribution. Whereby, it is possible to machine the workpiece W with a higher precision. Further, the scattered light is absorbed by the discharge tube 192, so there is no need to separately provide another element for removing the scattered light. Therefore, scattered light can be effectively removed by a simpler configuration.

Next, referring to FIG. 11, a resonator part 210 according to still another embodiment will be explained. Note that, elements similar to the above embodiments are assigned the same numeral references, and the detailed explanations thereof are omitted. The resonator part 210 includes an output mirror 32, a rear mirror 34, and a discharge tube 212 arranged between the output mirror 32 and the rear mirror 34. The discharge tube 212 includes a first discharge tube 214 adjoining the output mirror 32; a second discharge tube 216 adjoining a right side of the first discharge tube 214; a third discharge tube 218 adjoining the rear mirror 34; and a fourth discharge tube 220 arranged between the second discharge tube 216 and the third discharge tube 218.

Each of the first to fourth discharge tubes 214, 216, 218 and 220 is comprised of e.g. quartz, and has an electrode (not shown) which are connected to the external power source. Further, the first discharge tube 214 and the second discharge tube 216, the second discharge tube 216 and the fourth discharge tube 220, and the fourth discharge tube 220 and the third discharge tube 218 are respectively coupled each other via connection members (not shown).

The first discharge tube 214 has a left end face (first end part) 222 facing the output mirror 32; a right end face 224 opposite the left end face 222; and an inner circumferential surface 226 extending from the left end face 222 to the right end face 224. The inner diameter of the inner circumferential surface 226 gets continuously larger toward the rear mirror 34 from the inner diameter R41 at the left end face 222 to the inner diameter R42 at the right end face 224.

The second discharge tube 216 has a left end face 228 facing the right end face 224 of the first discharge tube 214; a right end face 230 opposite the left end face 228; and an inner circumferential surface 232 extending from the left end face 228 to the right end face 230. The inner diameter of the inner circumferential surface 232 gets continuously larger toward the rear mirror 34 from the inner diameter R43 at the left end face 228 to the inner diameter R44 at the right end face 230.

The third discharge tube 218 has a right end face (second end part) 234 facing the rear mirror 34; a left end face 236 opposite the right end face 234; and an inner circumferential surface 238 extending from the right end face 234 to the left end face 236. The inner diameter of the inner circumferential surface 238 gets continuously larger toward the output mirror 32 from the inner diameter R45 at the right end face 234 to the inner diameter R46 at the left end face 236.

The fourth discharge tube 220 has a left end face 240 facing the right end face 230 of the second discharge tube 216; a right end face 242 facing the left end face 236 of the third discharge tube 218; and an inner circumferential surface 244 extending from the left end face 240 to the right end face 242. The inner diameter of the inner circumferential surface 244 gets continuously larger toward the output mirror 32 from the inner diameter R47 of the right end face 242 to the inner diameters R48 at the left end face 240.

The above-mentioned inner diameters R41 to R48 are set to satisfy the relationships shown in the following formulas 10 to 12.

$$R41 < R42 \leq R43 < R44 \quad \text{(formula 10)}$$

$$R45 < R46 \leq R47 < R48 \quad \text{(formula 11)}$$

$$R44 \approx R48 \quad \text{(formula 12)}$$

As specific examples of the inner diameters R41 to R48, there are R41=20.00 mm, R42=20.05 mm, R43=20.05 mm, R44=20.10 mm, R45=20.00 mm, R46=20.05 mm, R47=20.05 mm, and R48=20.10 mm.

According to the present embodiment, the inner diameter of the discharge tube 212 gets gradually larger from the left end face 222 of the first discharge tube 214 to the right end face 230 of the second discharge tube 216. Thus, the first discharge tube 214 and the second discharge tube 216 constitute a first part of the discharge tube 212, the inner diameter of which gets larger from the end face 222 toward the rear mirror 34.

In other words, the inner diameter of the discharge tube 212 gradually decreases from the right end face 230 of the second discharge tube 216 to the left end face 222 of the first discharge tube 214. According to this configuration, the scattered light contained in the laser beam propagating toward the output mirror 32 is absorbed by the inner circumferential surfaces 232 and 226 which gradually decrease in diameter, as the laser beam propagates in the second discharge tube 216 and the first discharge tube 214 toward the output mirror 32. Therefore, the scattered-light components in the laser beam incident on the output mirror 32 can be removed.

On the other hand, the inner diameter of the discharge tube 212 gradually increases from the right end face 234 of the third discharge tube 218 to the left end face 240 of the fourth discharge tube 220. Thus, the third discharge tube 218 and the fourth discharge tube 220 constitute a second part of the discharge tube 212, the inner diameter of which gets larger from the end face 234 toward the output mirror 32.

In other words, the inner diameter of the discharge tube 212 gradually decreases from the left end face 240 of the fourth discharge tube. 220 to the right end face 234 of the third discharge tube 218. According to this configuration, the scattered light contained in the laser beam propagating toward the rear mirror 34 is absorbed by the inner circumferential surfaces 244 and 238 which gradually decrease in diameter, as the laser beam propagates in the fourth discharge tube 220 and the third discharge tube 218. Therefore, the scattered-light components in the laser beam incident on the rear mirror 34 can be removed.

According to this embodiment, it is possible to effectively remove the scattered-light component from a laser beam propagating toward either the output mirror 32 and the rear mirror 34, whereby it is possible to emit the laser beam 16 having a further higher quality intensity distribution to the outside. As a result, it is possible to process the workpiece W with a higher precision. Further, the scattered light is absorbed in the discharge tube 212, so there is no need to separately provide another element for removing the scattered light. Therefore, it becomes possible to effectively remove the scattered light by a simpler configuration.

Note that, in the above embodiments, the case where the discharge tubes adjoining each other in the axial direction are coupled through connection members was explained. However, the invention is not limited to this. The adjoining discharge tubes may also be coupled with each other so that the adjacent end faces thereof contact each other. That is, in this specification, "adjoining" (or "adjacent") includes the state of the tubes facing each other separated by a predetermined distance and the state where they contact each other.

Figure 9:
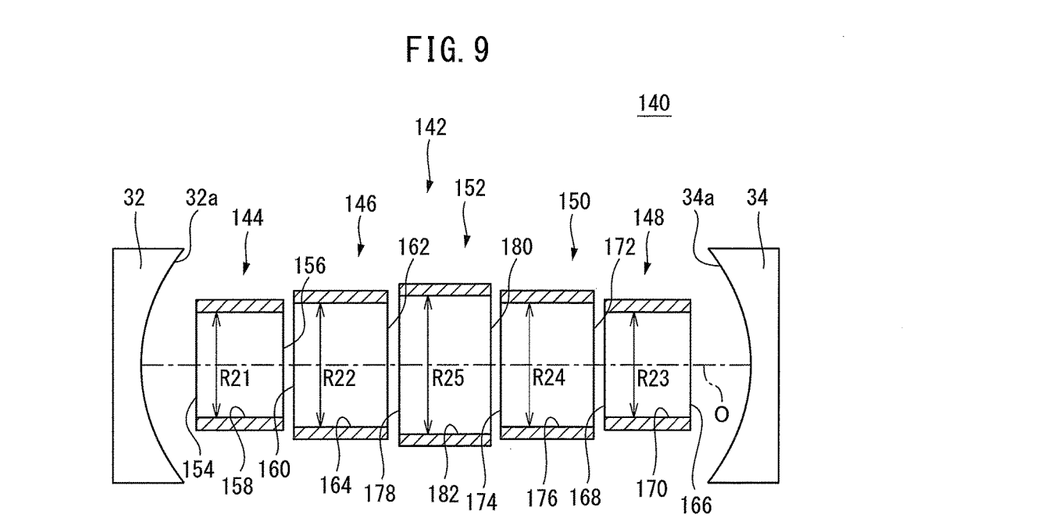
FIG. 9 is a schematic view of a resonator part according to still another embodiment of the invention, wherein only a discharge tube is illustrated in cross-section.

Further, in the embodiment which is shown in FIG. 9, the case was explained where the discharge tube 142 was provided with a total of five discharge tubes 144, 146, 148, 150, and 152. However, the invention is not limited to this. The discharge tube 142 may also include a total of "n" number of discharge tubes ("n" is any integer).

Specifically, the discharge tube 142 includes a discharge tube $DT_1$, a discharge tube $DT_2$, a discharge tube $DT_{n-1}$, and a discharge tube $DT_n$, in order closest from the output mirror 32. These discharge tube $DT_1$, discharge tube $DT_2$, . . . , discharge tube $DT_{n-1}$, and discharge tube $DT_n$ respectively have inner diameters $r_1, r_2, \ldots, r_{n-1}$, and $r_n$ which are constant in the axial direction.

In this case, the inner diameters $r_1$ to $r_n$ are set to satisfy the relationships shown by the following formulas 13 to 15, i.e.:

$$r_1 < r_n < r_2 < r_{n-1} < \ldots < r_{n/2} \text{ (in case where "n" is even number)} \quad \text{(formula 13)};$$

$$r_1 < r_n < r_2 < r_{n-1} < \ldots < r_{(n+1)/2} \text{ (in case where "n" is odd number)} \quad \text{(formula 14); and}$$

$$|r_m - r_{m-1}| < 100 \text{ μm ("m" is any integer)} \quad \text{formula (15)}$$

Figure 11:
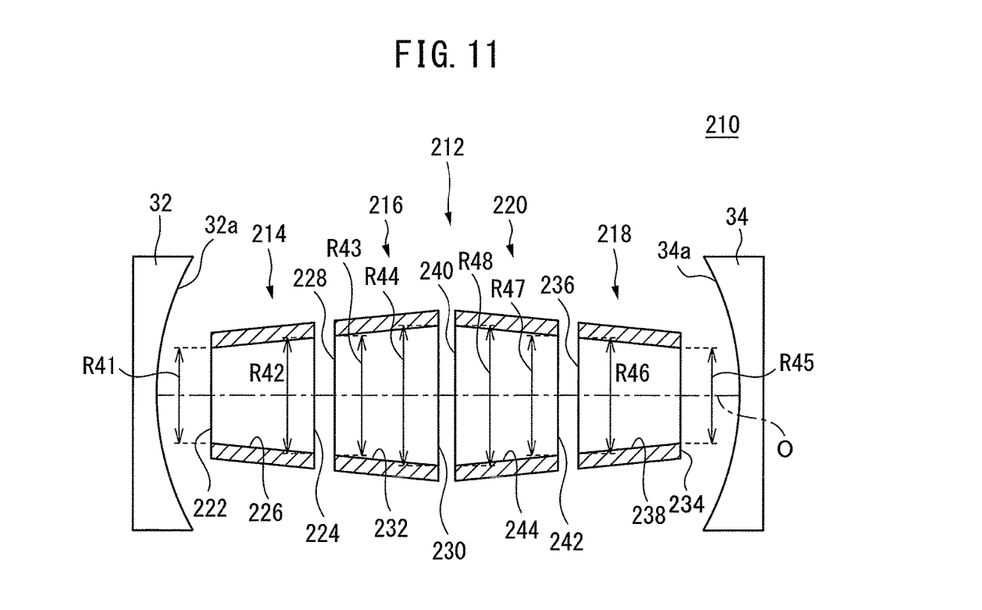
FIG. 11 is a schematic view of a resonator part according to still another embodiment of the invention, wherein only a discharge tube is illustrated in cross-section.

Further, in the embodiment shown in FIG. 11, the case was explained where the discharge tube 212 has a total of four discharge tubes 214, 216, 218, and 220. However, the invention is not limited to this. The discharge tube 212 may also include a total of "m" number of discharge tubes ("m" is any integer).

For example, the discharge tube 212 includes a total of 2n number of discharge tubes, i.e., a discharge tube $DT_1$, a discharge tube $DT_2$, a discharge tube $DT_{n-1}$, and a discharge tube $DT_n$ in order closest from the output mirror 32. In addition, the discharge tube 212 further includes a discharge tube $DT_1'$, a discharge tube $DT_2'$, . . . , a discharge tube $DT_{n-1}'$, and a discharge tube $DT_n'$ in order closest from the rear mirror 34.

In this case, the discharge tubes $DT_1$ to $DT_n$ constitute the first part of the discharge tube 212. That is, the inner diameter of the discharge tube 212 gets larger from the discharge tube $DT_1$ to the discharge tube $DT_n$ toward the rear mirror 34. On the other hand, the discharge tubes $DT_1'$ to $DT_n'$ constitute the second part of the discharge tube 212. That is, the inner diameter of the discharge tube 212 gets larger from the discharge tube $DT_1'$ to the discharge tube $DT_n'$ toward the output mirror 32.

Here, among the discharge tubes which constitute the first part, regarding the discharge tube $DT_k$ positioned at the k-th place in order from the one closest to the output mirror 32 ("k" is any integer) and the discharge tube $DT_{k+1}$ adjoining the right side of the discharge tube $DT_k$, the inner diameter at the right end face of the discharge tube $DT_k$ is set smaller than the inner diameter at the left end face of the discharge tube $DT_{k+1}$. In this case, the difference between the inner diameter at the right end face of the discharge tube $DT_k$ and the inner diameter at the left end face of the discharge tube $DT_{k+1}$ is smaller than 100 μm.

On the other hand, among the discharge tubes which constitute the second part, regarding the discharge tube $DT_k'$ positioned at the k-th place in order from one closest to the rear mirror 34 and the discharge tube $DT_{k+1}'$ adjoining the left side of the discharge tube $DT_k'$, the inner diameter at the left end face of the discharge tube $DT_k'$ is set smaller than the inner diameter of the right end face of the discharge tube $DT_{k+1}'$. In this case, the difference between the inner diameter at the left end face of the discharge tube $DT_k'$ and the inner diameter at the right end face of the discharge tube $DT_{k+1}'$ is smaller than 100 μm.

Further, the inner diameter at the left end face of the discharge tube $DT_k$ may be set smaller than the inner diameter at the right end face of the discharge tube $DT_k'$. Further, the inner diameter at the right end face of the discharge tube $DT_k$ may be set smaller than the inner diameter at the left end face of the discharge tube $DT_k'$.

Above, embodiments of the invention were used to explain the invention, but the above embodiments do not limit the inventions according to the claims. Further, combinations of the features which are explained in the embodiments of the invention may also be included in the technical scope of the invention. However, not all of the combinations of these features are necessarily essential for the solution of the invention. Further, the fact that the above embodiments can be changed or improved in various ways would be clear to a person skilled in the art.

The invention claimed is:

1. A laser oscillator comprising:
   an output mirror and a rear mirror arranged opposite to each other; and
   a discharge tube arranged between the output mirror and the rear mirror, and configured to generate an electric discharge to excite a laser medium in the discharge tube,
   the discharge tube including:
      a first end in an axial direction, the first end being closest to the output mirror in the discharge tube,
      a second end in the axial direction, the second end being closest to the rear mirror in the discharge tube, and
      a largest inner diameter portion, which is arranged between the first end and the second end, and at which the inner diameter of the discharge tube is largest,
   wherein the inner diameter of the discharge tube varies in the axial direction so that:
      the inner diameter gets larger in a stepwise manner over an entire section in the axial direction between the first end and the largest inner diameter portion, as travelling from the first end to the largest inner diameter portion, and
      the inner diameter gets larger in a stepwise manner over an entire section in the axial direction between the second end and the largest inner diameter portion, as travelling from the second end to the largest inner diameter portion,
   wherein the discharge tube includes:
      a first discharge tube including the first end and having a first inner diameter which is constant in the axial direction, the first discharge tube being configured to generate electric discharge inside thereof by an electric voltage applied to the first discharge tube; and
      a second discharge tube arranged to adjoin the first discharge tube at the opposite side to the output mirror, and having a second inner diameter which is constant in the axial direction, the second inner diameter being larger than the first inner diameter, the second discharge tube being configured to generate electric discharge inside thereof by the electric voltage applied to the second discharge tube.

2. The laser oscillator according to claim 1, wherein the difference between the first inner diameter and the second inner diameter is smaller than 100 μm.

3. The laser oscillator according to claim 1, wherein the discharge tube includes:
- a third discharge tube including the second end and having a third inner diameter which is constant in the axial direction; and
- a fourth discharge tube arranged to adjoin the third discharge tube at the opposite side to the rear mirror, and having a fourth inner diameter which is constant in the axial direction, the fourth inner diameter being larger than the third inner diameter.

4. A laser processing machine comprising a laser oscillator according to claim 1.

* * * * *